(12) United States Patent
Palinkas

(10) Patent No.: US 7,083,165 B2
(45) Date of Patent: Aug. 1, 2006

(54) SIDE BEARING PAD

(75) Inventor: Richard L. Palinkas, Northfield, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 779 days.

(21) Appl. No.: 09/407,053

(22) Filed: Sep. 27, 1999

(65) Prior Publication Data

US 2002/0053765 A1 May 9, 2002

(51) Int. Cl.
*B60G 11/22* (2006.01)
*F16F 1/40* (2006.01)

(52) U.S. Cl. .................... 267/294; 267/141.1; 267/153

(58) Field of Classification Search ............... 267/294, 267/153, 141, 191.1, 292, 293
See application file for complete search history.

(56) References Cited

U.S. PATENT DOCUMENTS

| | | | | |
|---|---|---|---|---|
| 123,999 A | * | 2/1872 | King ........................... 303/138 |
| 136,079 A | * | 2/1873 | Magowan ................... 303/138 |
| 1,772,414 A | * | 8/1930 | Brooke-hunt et al. ....... 267/294 |
| 2,547,852 A | * | 4/1951 | Bryan ......................... 303/138 |
| 3,570,409 A | * | 3/1971 | Oelkers ...................... 105/182 |
| 3,712,691 A | * | 1/1973 | Cope .......................... 308/138 |
| 3,814,411 A | * | 6/1974 | Aarons et al. ............. 267/63 R |
| 3,865,443 A | * | 2/1975 | James ......................... 308/138 |
| 3,961,582 A | * | 6/1976 | Paton et al. ..................... 105/3 |
| 4,109,934 A | * | 8/1978 | Paton et al. ................. 280/716 |
| 4,150,627 A | * | 4/1979 | Paton et al. ................. 105/224 |
| 4,198,037 A | * | 4/1980 | Anderson ................... 267/153 |
| 4,214,738 A | * | 7/1980 | Casper .................... 267/141.1 |
| 4,465,799 A | * | 8/1984 | Platkiewicz et al. ........ 523/457 |
| 4,527,781 A | * | 7/1985 | Pees et al. ................ 267/64.24 |
| 4,566,678 A | * | 1/1986 | Anderson ................ 267/141.1 |
| 4,781,365 A | * | 11/1988 | Harrison ..................... 267/294 |
| 4,861,007 A | * | 8/1989 | Morini ....................... 267/153 |
| 4,997,171 A | * | 3/1991 | Toms, Jr. .................... 267/294 |
| 4,998,997 A | * | 3/1991 | Carlston ......................... 267/3 |
| 5,036,774 A | * | 8/1991 | Curtis et al. .................. 105/4.1 |
| 5,086,707 A | * | 2/1992 | Spencer et al. ........... 105/199.3 |
| 5,150,658 A | * | 9/1992 | Grandy ..................... 105/218.1 |
| 5,456,454 A | * | 10/1995 | Schulz et al. ............... 267/293 |
| 5,806,435 A | * | 9/1998 | Pitchford ................. 105/199.3 |
| 5,941,351 A | * | 8/1999 | Etnyre .................... 188/322.17 |
| 6,092,470 A | * | 7/2000 | O'Donnell ............... 105/199.3 |
| 6,170,812 B1 | * | 1/2001 | Nicoles ....................... 267/281 |
| 6,209,857 B1 | * | 4/2001 | Berends ..................... 267/140 |
| 6,412,586 B1 | * | 7/2002 | Askew ....................... 180/309 |

* cited by examiner

*Primary Examiner*—James McClellan
*Assistant Examiner*—Mariano Sy
(74) *Attorney, Agent, or Firm*—Michael P. Dilworth

(57) ABSTRACT

In a side bearing pad assembly two housings are provided, each having a bore of such size and orientation that the housings slide telescopically one within the other. When assembled the bores constitute a single internal cavity which houses resilient members. Each housing is mounted onto a load bearing member. The biasing resilient members urge the load bearing members apart when a compressive load is imposed on either of such members. The resilient members respond in a non-linear manner to force exerted on them.

18 Claims, 3 Drawing Sheets

$$F(x) = \pi d D E_o \left[ 1.25 (x/d)^{3/2} + 50 (x/d)^6 \right]$$

$D = 2.875$ in.
$d = 1.32$ in.
$E_o = 3000$ psi

SIDE BEARING PAD

FIELD OF THE INVENTION

The present invention relates generally to springs and is more specifically directed to devices that dampen lateral rolling motions that occur during the movement of railroad cars.

BACKGROUND OF THE INVENTION

Railroad cars in transit exhibit lateral roll due to track irregularities, inertia while negotiating turns, and even cross winds. Their high profile, high center of gravity, and great mass amplify these influences so that roll control is necessary to allow higher speeds around turns and to facilitate passenger comfort. Such lateral roll is exacerbated when rail cars are loaded with passengers or cargo, further increasing the car's mass and elevating its center of gravity.

In general, axles and wheels of a rail car are mounted on wheel trucks that in turn support a carriage. A two stage suspension system comprising a primary and a secondary stage is generally employed on the wheel trucks. The primary stage isolates the wheel truck, commonly referred to by those skilled in the art to which the present invention pertains as a bogie, from the wheels, while the secondary stage isolates the carriage itself from the bogie. The most common primary suspension systems employ wedges or chevron springs, typically made of rubber bonded to metal, and positioned between the bogie and the axles of the rail car. Primary suspension systems have little or no effect on controlling lateral roll.

In the above-referenced suspension system the carriage usually rests on a beam that spans the bogie parallel to the axles. This beam is referred to as a bolster by those skilled in the art to which the present invention pertains. The secondary suspension system includes mounts for coupling both the bolster to the bogie, and the carriage to the bolster. Generally, the bolster is supported on steel helical coil springs called bolster springs. The way in which the carriage is mounted to the bolster can vary. For example, a cleat and pad arrangement referred to as a side bearer mount is commonly employed. In this arrangement, the cleat is mounted to the bolster and can be in the form of a metal block or a block holding a wheel or a pad. Generally, the pad is made of laminated rubber and steel, and is bolted to the carriage underbody. More recent pad designs employ urethane springs bonded with rubber. These mounting devices physically limit the extent of rail car lateral roll but do little to dampen roll forces. Because these devices are not in continuous contact with the carriage, and because they employ little if any resilient material, these side bearer mounts do little to dampen impact between the carriage and the bolster during movement of the rail car. The high initial impulse of the carriage contacting the bolster can jar unsecured cargo within the carriage.

Secondary stage suspension systems for passenger carriages are generally more sophisticated than those for freight carriages, typically employing air suspension devices that may be used in conjunction with or in place of side bearer mounts. Air systems employ a rubber housing that defines an interior space filled with pressurized air from the rail car's pneumatic system. These air systems are mounted in pairs on either side of the bolster, at the center of the bolster, or both. They typically provide a smoother ride and better control of lateral roll than side bearer mounts. Some high speed trains employ computer controlled pressurized air suspension systems which further improves ride properties and lateral roll control. However, all of the existing air systems employ numerous interdependent components, making them expensive and prone to reliability problems. Recent innovations include using urethane springs bonded with rubber in the secondary stage suspension between the carriage and the bolster. However, the high compression forces generated during operation tends to degrade the bond between the disparate materials, leading to higher maintenance and replacement costs.

It is the general object of the present invention to provide a secondary suspension system that overcomes the drawbacks and difficulties associated with known prior art systems. It is a more specific object of the present invention to provide an economical and reliable device for use in a rail car secondary suspension system that assures a smooth ride for rail cars carrying passengers.

SUMMARY OF THE INVENTION

The present invention is directed to a side bearing pad assembly for absorbing and cushioning compression forces. The assembly comprises a first and second housing, a first and second load bearing member, and biasing means. The first housing has an exterior surface and defines a bore extending at least partway through the first housing. The first housing is coupled to the first load bearing member, thus defining a first abutment surface on the first land bearing member opposite the first housing. The second housing has an exterior surface and also defines a bore extending at least partway therethrough. The second housing also has a bore, of a shape complementary to the exterior surface of the first housing, and is adapted to slidably or telescopically receive the first housing therein. The second housing is coupled to the second load bearing member, thus defining a second abutment surface on the second load bearing member opposite the second housing. Biasing means for urging the first and second load bearing members away from each other in response to a load being imposed on at least one of the abutment surfaces is also provided.

DETAILED DESCRIPTION OF THE PREFERRED EMBODIMENTS

Figure 1:
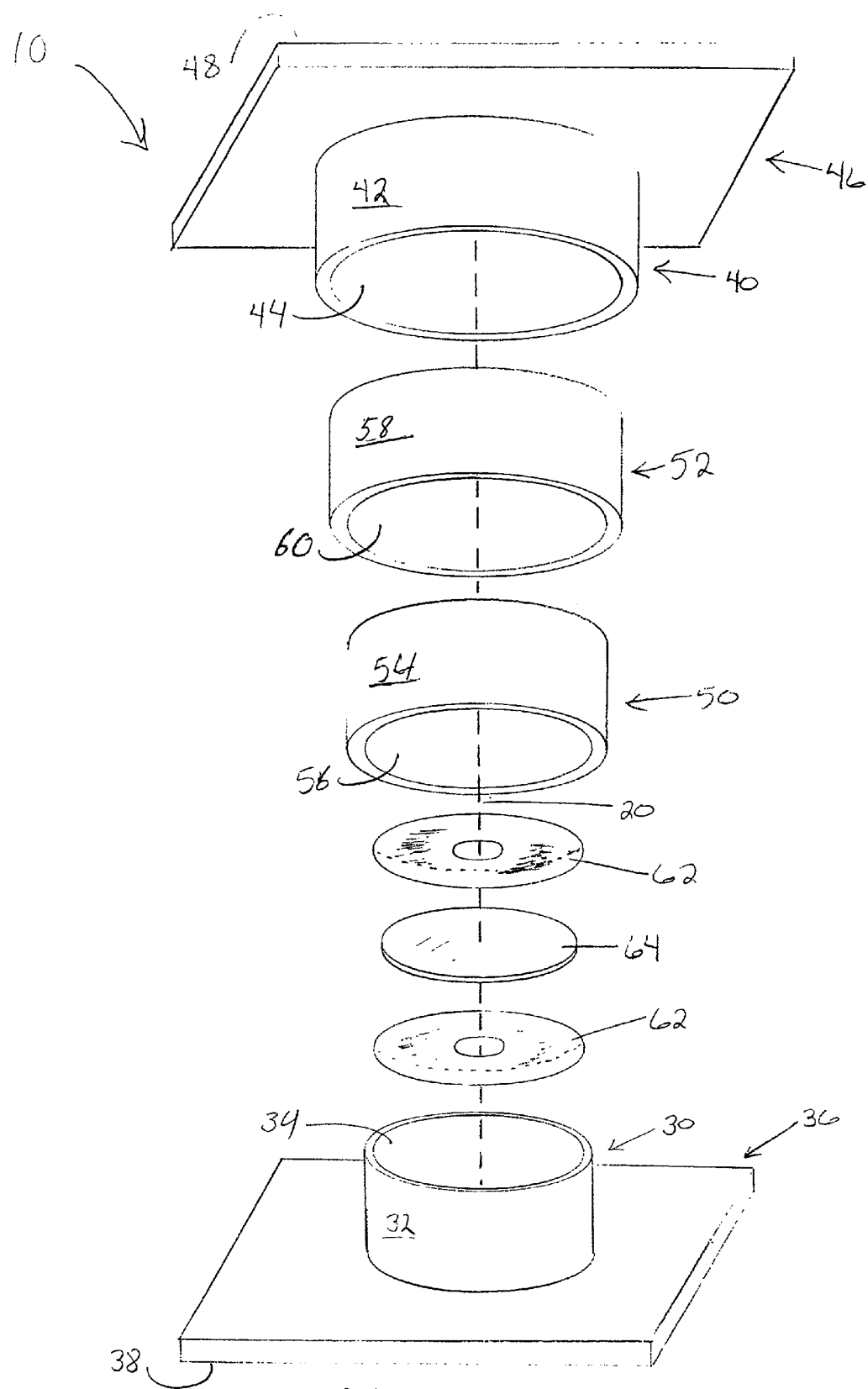
FIG. 1 is an exploded view of the preferred embodiment of the present invention.

As shown in FIG. 1, a side bearer pad assembly of the present invention is generally designated by the reference number 10 and is comprised of a plurality of components all positioned coaxially along a longitudinal axis 20. A first housing 30 is provided and includes a first exterior surface 32, and defines a first housing bore 34 extending through the first housing. The first housing 30 is fixedly joined to a first load bearing member 36 that defines a first abutment surface 38 opposite the first housing 30.

Similarly, a second housing 40 is provided having a second exterior surface 42 and defines a second housing bore 44 extending therethrough. The second housing 40 is fixedly joined to a second load bearing member 46 that defines a second abutment surface 48 opposite the second housing.

Still referring to FIG. 1, first and second slip linings, 50 and 52 respectively, are provided. The first slip lining 50 has a first lining exterior surface 54 and defines a first lining bore 56 extending therethrough. The first bore 54 has a shape complementary to the first housing exterior surface 32, and is adapted to receive the first housing therein. Similarly, the second slip lining 52 has a second lining exterior surface 58 and defines a second lining bore 60 extending therethrough. The second lining exterior surface 58 defines a shape complementary to and adapted to be received in the second housing bore 44. The first slip lining exterior surface 54 is also similar in shape but slightly smaller in size as compared to the second slip lining bore 60, so that the first slip lining 50 is slidably received with the second slip lining bore 60. Thus the first housing 30, the first slip lining 50, the second slip lining 52, and the second housing 40 all telescope along the axis 20.

The slip linings 50 and 52 ensure that the present invention, when subjected to a load, compresses essentially along its assembly axis 20 by occupying space between the first and second housings 30 and 40, respectively. The slip linings 50 and 52 also serve to reduce friction between the housings when the material of the slip lining has a lower coefficient of friction than that of the housings, and to disrupt direct noise transmission between the bolster and the carriage that would exist if the two housings contact each other. Preferably, the slip linings are made of a suitable material such as, but not limited to polypropylene due to its resistance to degradation by dirt, oil and grease. While two slip linings have been shown and described, the present invention is not limited in this respect as more or less than two slip linings may be employed without departure from the broader aspects of the present invention.

Figure 2:
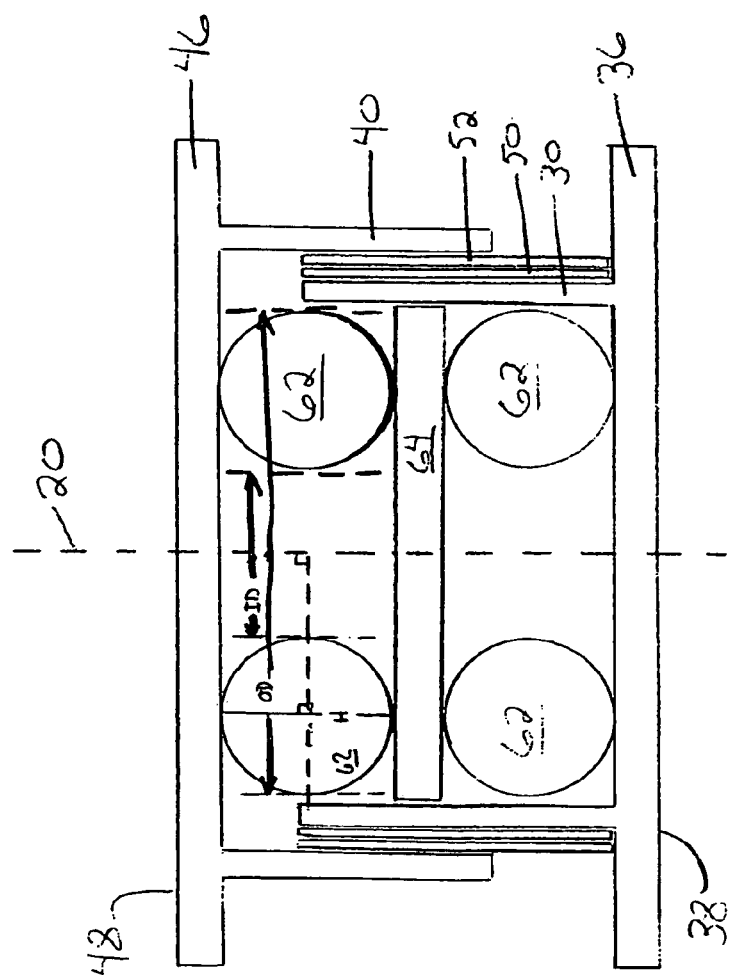
FIG. 2 is a cross-sectional side elevational view of the apparatus as shown in FIG. 1.

Referring to FIGS. 1 and 2, biasing means for urging the first and second load bearing members, 36 and 46, respectively, away from each other in response to a load being imposed on either or both abutment surfaces, 38 and 48, are provided in the form of two toroidal rings 62. A separating plate 64 is interposed between the toroidal rings 62 with the rings and the separating plate being sized so as to be received within the first housing bore 32. The separating plate 64 ensures that the axis of compression of the toroidal rings 62 does not become offset in relation to the assembly axis. While a flat plate 64 is illustrated, the present invention is not limited in this regard as a plate with surface depressions or conformations that increase surface area contact with one or both toroidal rings under a minimal or no-load condition may be substituted without departing from the broad aspects of the present invention. In addition, the plate 64 should be made from a suitable material. Polypropylene, laminated steel and rubber, laminated steel and a polymer, or other similar materials or combinations can be used to fashion such a formed plate.

Referring to FIG. 2, the toroidal rings 62 are made from a suitable material, such as, but not limited to polyurethane. While toroid shaped have been shown and described, the present invention is not limited in this regard as other shapes, such as square, can be employed without departing from the broader aspect of the present invention. However, the toroid shape must have an outside diameter OD minus an inside diameter ID equal to or greater than a height H when positioned in the bearing pad assembly.

In the cases such as where a circular and square cross section are rotated about an axis to form a toroid, the inner most point of the cross-section, the point closest to the axis of rotation of the toroid, is on a line drawn perpendicular to the axis of rotation of the toroid through the geometric center of the cross-section. Toroidal shapes having the limitation that inner most point of the cross section is on a line drawn perpendicular to the axis of rotation of the toroid through the geometric center of the cross-section are defined herein as special toroidal shapes.

Figure 3:
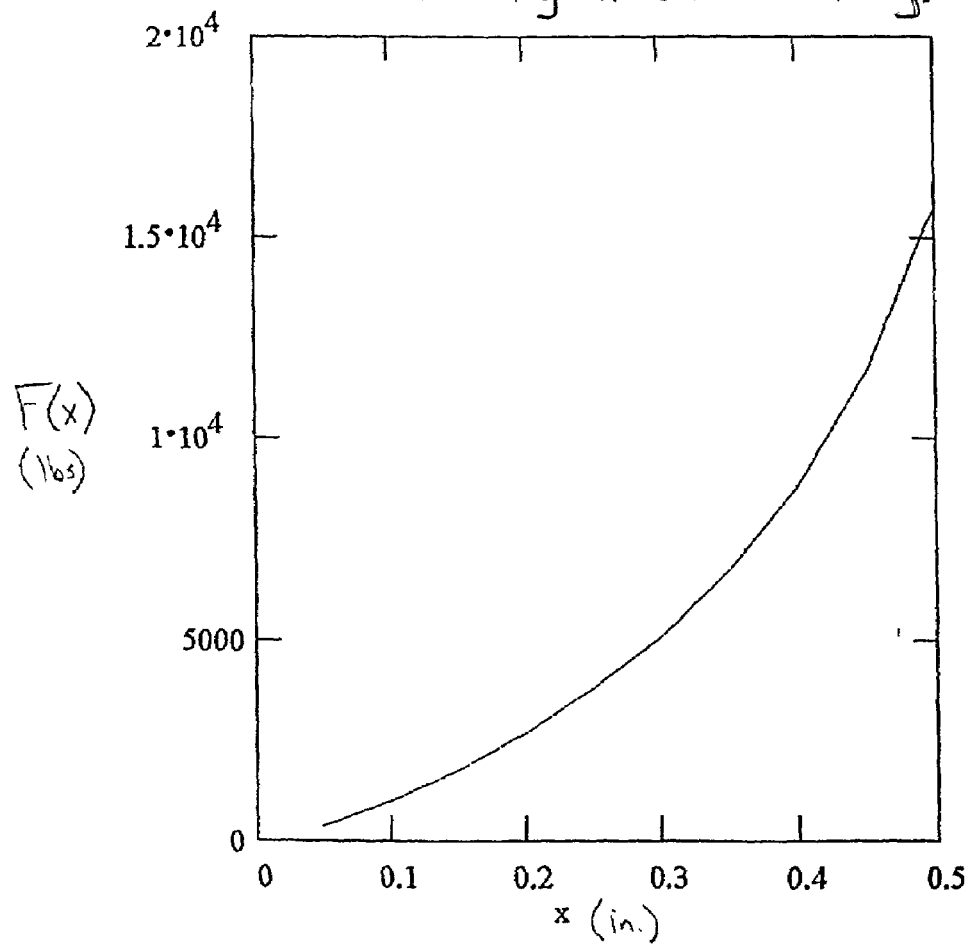
FIG. 3 is a graphical representation of force versus compression for two laterally unrestrained toroidal rings.

The toroidal ring shape is preferable for a rail car application since a toroid yields a non-linear spring (i.e.: a spring in which the relationship between compression and force defines a line whose slope is not constant). This non-linear characteristic is negligible until the toroidal rings are compressed beyond a certain minimal threshold. Compression of a laterally unrestrained toroidal ring can be calculated by the following formula:

$$F/(\pi d D E_O) = 1.25 [x/d]^{(3/2)} + 50(x/d)^6$$

where F=force applied
d=uncompressed height of the toroidal ring
D=diameter of the toroidal ring
$E_O$=modulus of elasticity
x=reduction in height of the toroidal ring The above relationship is plotted graphically for two rings at FIG. 3. Due to the two exponential relationships on the right side of the above equation (i.e. $[x/d]^{(3/2)}$ and $(x/d)^6$), compression of a toroidal ring exhibits significant non-linearity only when x/d>0.2. This gives the advantage of low initial impulse but high ultimate resistance, two characteristics particularly advantageous for an application in dampening the lateral roll of rail cars. Initial contact of the rail carriage with such a non-linear spring will feel gentler to passengers, and will not jolt unsecured cargo as severely as the side bearer mounts of the prior art. The present invention can be adapted to maintain continuous contact with the carriage such that the carriage 'rides' on the present invention much like more complicated air suspension systems. Such design advantages may allow rail cars to negotiate curves at speeds higher than those allowed by side bearer mounts of the prior art.

The preferred embodiment of the present invention exploits a lateral restraint characteristic for use in rail cars by employing toroidal rings whose largest diameter is slightly smaller than that of the first housing bore 32. This arrangement provides no lateral restraint during initial application of a compression force, resulting in a gentle initial cushioning of a rail car's lateral roll which is represented by the shallow slope at the left end of the graph in FIG. 3. Upon further compression the toroidal rings become laterally restrained, resulting in a higher ultimate force resistance and a better ability to control very large lateral forces. Such a large force may be encountered when a rail car traverses an unbanked curve at high speed. Graphically, actual response mirrors the low loading section at the left end of the graph in FIG. 3. At higher loadings where the housing laterally constrains the toroidal rings, actual response is a slope steeper than that portrayed at high loadings in FIG. 3, since FIG. 3 reflects unrestrained toroidal rings.

An alternative embodiment employs eye hooks on the load bearing members 36 and 46 or housings (30 and 40) by which a turnbuckle with threaded rods or similar such apparatus may attach to compress the present invention independent of a load imposed on the abutment surfaces 38 and 48. This modification allows the present invention on one side of a bolster to be compressed so that the present invention on the opposite side of the bolster may be easily removed and replaced, without the need for high capacity jacks to support the carriage. This modification is particularly valuable when the present invention is adapted to maintain continuous contact with the carriage similar to air suspension systems, since the biasing means will always be under some level of compression even when the rail car is at rest. A compression jack may alternatively attach to holes, slots, or cavities within the housings (30 and 40), the load bearing members (36 and 46), or combinations thereof.

The above preferred and alternative embodiments are illustrative rather than exhaustive, and may be combined in whole or in part to attain a particular set of advantages. Such combinations, and modifications thereof, are within the scope of this disclosure and will be apparent to those skilled in that art consistent with the teachings herein. The scope of the following claims encompass such modifications and variations in accordance with the Doctrine of Equivalents.

What is claimed is:

1. A bearing pad assembly comprising:
    a first housing having an exterior surface and defining a bore extending at least part-way through said first housing;
    a first load bearing member coupled to said first housing, and defining an outwardly facing first abutment surface;
    a second housing defining a bore of a shape similar to said exterior surface of said first housing and adapted to slideably receive said first housing therein;
    a second load bearing member coupled to said second housing and defining an outwardly facing second abutment surface opposite to said first abutment surface;
    at least one slip lining positioned between said first housing exterior surface and a bore wall defining said second housing bore; and
    at least one compression spring positioned within said first housing bore, said compression spring comprising a solid resilient material having a torus shape.

2. The assembly of claim 1 wherein the compression spring deforms non-linearly in response to a load imposed on at least one of the first and second abutment surfaces.

3. The assembly of claim 1 wherein said solid resilient material is substantially an organic polymer.

4. The assembly of claim 3 wherein said organic polymer is substantially polyurethane.

5. The assembly of claim 1 wherein said compression spring includes:
    at least two compression springs; and
    a plate positioned between said compression springs separating said compression springs from one another.

6. The assembly of claim 1 wherein the slip lining has a coefficient of static friction less than that of the first housing.

7. The assembly of claim 1 wherein the slip lining is attached to the first housing exterior surface.

8. The assembly of claim 1 wherein a second slip lining is attached to the second housing bore wall.

9. The assembly of claim 1 wherein the slip lining is made substantially of an organic polymer.

10. The assembly of claim 9 wherein the slip lining is made substantially of polypropylene.

11. A bearing pad assembly comprising:
    a first housing having a bore extending through said first housing;
    a first load bearing member coupled to said first housing and defining an abutment surface opposite to said first housing;
    a second housing having a bore extending through said second housing, adapted to telescopically receive said first housing;
    a second load bearing member coupled to said second housing and defining an abutment surface opposite to said second housing; and
    at least one compression spring in the shape of a torus positioned within said first housing bore.

12. The assembly of claim 1 wherein the compression spring has a largest diameter slightly smaller than that of the first housing bore.

13. The assembly of claim 11 further comprising two compression springs positioned within said first housing bore.

14. The assembly of claim 13 further comprising a plate positioned between the springs, separating the springs from one another.

15. The assembly of claim 11 further comprising a first slip lining attached to said first housing exterior surface.

16. The assembly of claim 15 further comprising a second slip lining attached to the second housing bore wall.

17. The assembly of claim 1 wherein said torus shaped compression spring defines an outside diameter minus an inside diameter equal to or greater than a height when positioned in the bearing pad assembly.

18. The assembly of claim 11 wherein said torus shaped compression spring defines an outside diameter minus an inside diameter equal to or greater than a height when positioned in the bearing pad assembly.

* * * * *